(12) United States Patent
Anderson et al.

(10) Patent No.: US 7,609,924 B2
(45) Date of Patent: Oct. 27, 2009

(54) TWO PIECE BOWDEN CABLE ASSEMBLY WITH ONE MOTION CONNECTION AND ADJUSTMENT

(75) Inventors: Warren Anderson, Elmira, MI (US); Eric Klammer, Saginaw, MI (US)

(73) Assignee: Hi-Lex Corporation, Troy, MI (US)

( * ) Notice: Subject to any disclaimer, the term of this patent is extended or adjusted under 35 U.S.C. 154(b) by 0 days.

(21) Appl. No.: 11/668,811

(22) Filed: Jan. 30, 2007

(65) Prior Publication Data
US 2008/0178703 A1    Jul. 31, 2008

(51) Int. Cl.
*G02B 6/44* (2006.01)
(52) U.S. Cl. .................................. 385/100; 385/115
(58) Field of Classification Search ................ 385/100, 385/115
See application file for complete search history.

(56) References Cited

U.S. PATENT DOCUMENTS

| | | | |
|---|---|---|---|
| 4,175,450 A | 11/1979 | Bennett | 74/501 P |
| 4,294,133 A | 10/1981 | Hurley | 74/501 P |
| 4,331,041 A | 5/1982 | Bennett | 74/501.5 R |
| 4,841,806 A | 6/1989 | Spease | 74/500.5 |
| 5,039,138 A | 8/1991 | Dickirson | 285/314 |
| 5,161,428 A | 11/1992 | Petruccello | 74/502.4 |
| 5,178,034 A | 1/1993 | Reasoner | 74/502.6 |
| 5,207,116 A | 5/1993 | Sultze | 74/502.4 |
| 5,261,293 A | 11/1993 | Kelley | 74/502.6 |
| 5,295,408 A | 3/1994 | Nagle et al. | 74/502.6 |
| 5,383,377 A | 1/1995 | Boike | 74/502 |
| 5,394,770 A | 3/1995 | Boike et al. | 74/502.4 |
| 5,398,566 A | 3/1995 | Moore | 74/502.4 |
| 5,435,202 A | 7/1995 | Kitamura | 74/502.4 |
| 5,477,745 A | 12/1995 | Boike et al. | 74/502.6 |
| 5,577,415 A | 11/1996 | Reasoner | 74/502.4 |
| 5,598,743 A | 2/1997 | Yasuda | 74/502.4 |
| 5,632,182 A | 5/1997 | Reasoner | 74/502.4 |
| 5,655,415 A | 8/1997 | Nagle et al. | 74/502.6 |

*Primary Examiner*—Jennifer Doan
(74) *Attorney, Agent, or Firm*—Young Basile

(57) ABSTRACT

A remote control motion transmitting cable assembly comprising a fist cable sub-assembly including a first core element having a free end, a first guide length including a first guide conduit positioned in surrounding relation to the first core element and a first end fitting positioned in surrounding relation to the free end of the first core element, and a second cable sub-assembly including a second core element having a free end, a second guide length including a second guide conduit positioned in surrounding relation to the second core element and a second end fining positioned in surrounding relation to the free end of the second core element. The cable sub-assemblies include connector structure operative in response to relative axial movement of the cable sub-assemblies to couple the end fittings together, lock the free ends of the core elements together, and adjust the overall length of the locked core elements.

22 Claims, 8 Drawing Sheets

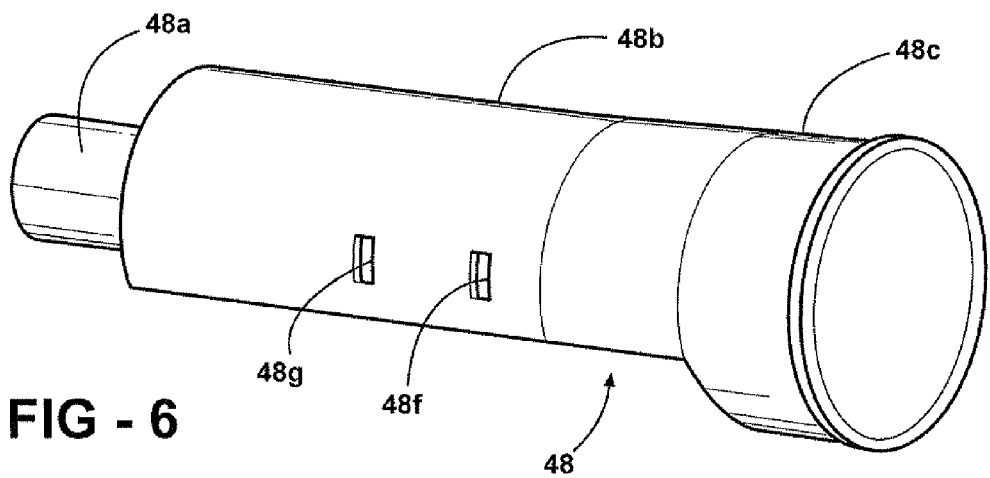
FIG - 6
FIG - 7
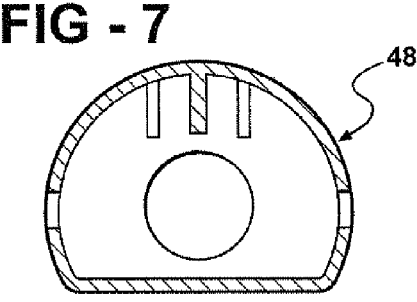
FIG - 8
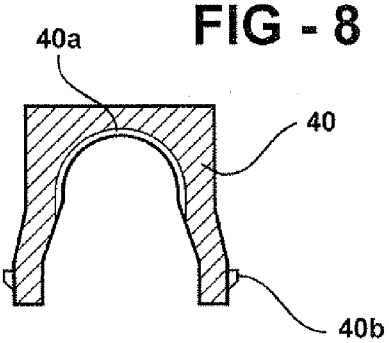
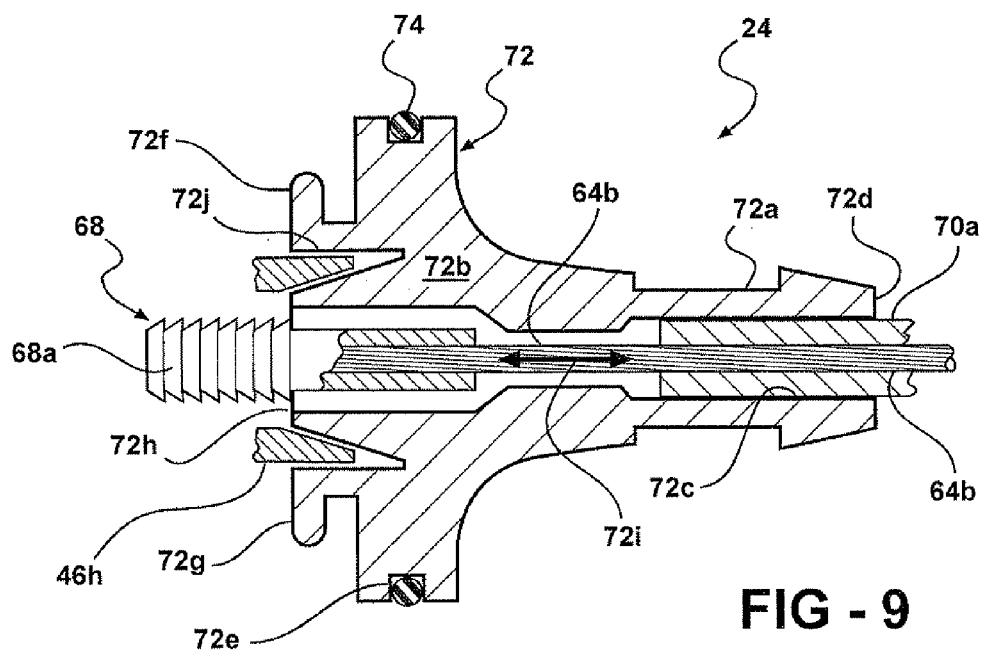
FIG - 9

TWO PIECE BOWDEN CABLE ASSEMBLY WITH ONE MOTION CONNECTION AND ADJUSTMENT

BACKGROUND OF THE INVENTION

This invention relates to cable assemblies and more particularly to cable assemblies of the Bowden type including an outer conduit and a central core element in the form of a wire.

In a typical automotive cable assembly usage, the core element is attached at one end to a remote member, for example a transmission control lever, and is connected at the opposite end to an actuator member, such as a vehicle shift lever. The connection is such that movement of the actuation member is transmitted through the core element and results in corresponding actuation or movement of the remote member.

It is critical that the relative position of the actuation member and the remote member be maintained, i.e. if the shift lever is placed in neutral, it is imperative that the vehicle transmission also be placed in neutral. During installation of a cable assembly, proper positioning of the respective parts is obtained by adjusting the overall length of the cable. This may be accomplished either by adjusting the overall length of the core element or by adjusting the overall length of the conduit which in effect adjusts the length of the core element.

Typically an automotive transmission control cable assembly is formulated as two cable sub-assemblies with the core element of one of the cable assemblies attached to the vehicle shift lever, the core element of the other cable assembly attached to the transmission control arm, and end fittings at the free ends of core assemblies coupled together to complete the operative connection between the shift lever and the transmission control arm. Whereas this two piece cable sub-assembly arrangement is generally satisfactory, complicated manipulation of the end fittings is required during the coupling process to adjust the overall length of the cable assembly for satisfactory operation of the cable assembly and disassembly of the cable assembly for maintenance, repair or adjustment is extremely difficult and time consuming.

SUMMARY OF THE INVENTION

The invention relates to a remote control motion transmitting cable assembly comprising a first cable sub-assembly including a first core element having a free end, a first guide length including a first guide conduit positioned in surrounding relation to the first core element and a first end fitting positioned in surrounding relation to the free end of the first core element, and a second cable sub-assembly including a second core element having a free end, a second guide length including a second guide conduit positioned in surrounding relation to the second core element and a second end fitting positioned in surrounding relation to the free end of the second core element.

According to an important feature of the invention, the cable sub-assemblies include connector means operative in response to axial one motion movement of the cable sub-assemblies to couple the end fittings together, lock the free ends of the core elements together, and adjust the effective overall length of the locked core elements relative to the effective overall length of the coupled guide length. This arrangement, wherein one coupling motion couples the sub-assemblies together and simultaneously adjusts the length of the cable assembly, greatly simplifies the connection process. In a disclosed embodiment of the invention, the adjustment of the effective overall length of the locked core elements relative to the effective overall length of the coupled guide lengths is effected by adjusting the effective overall length of the locked core elements.

According to a further feature of the invention, the connector means includes serrations on the free end of the second core element and a serrated latch member carried by the free end of the first core element and moveable laterally into locking engagement with the second core element serrations in response to the relative axial movement of the cable sub-assemblies whereby to lock the free ends of the core elements together.

According to a further feature of the invention, the free end of the first core element comprises a slider mounting the latch member and the first fitting includes an inner housing slidably mounting the slider, an outer housing positioned in surrounding relation to the inner housing, a depressor plate positioned within the outer housing in overlying relation to the slider and the latch member carried thereby, and coacting cam structures on the outer housing and the depressor plate. The coacting cam structures are operative in response to the relative axial movement of the cable sub-assemblies to move the depressor plate laterally and move the latch member laterally into locking engagement with the second core element serrations.

According to a further feature of the invention, the depressor plate is moveable axially relative to the inner housing between a transport position in which lateral movement of the depressor plate is precluded and an operative position in which lateral movement of the depressor plate is allowed, and the depressor plate is moveable axially from its transport position to its operative position in response to the initial relative axial movement of the cable sub-assemblies.

According to a further feature of the invention, the depressor plate includes a main body portion positioned in overlying relation to the slider and the latch member and a plurality of feet, and the inner housing includes a plurality of apertures for respective receipt of the depressor plate feet as the depressor plate is moved to its operative position.

According to a further feature of the invention, the inner housing includes at least one spring latch finger proximate a leading end thereof for latching coaction with a rim on a leading end of the second fitting and the latch finger moves into latching engagement with the rim as the depressor plate moves from its transport to its operative position.

According to a further feature of the invention, the leading end of the second fitting moves into abutting engagement with the leading end of the first fitting as the depressor plate moves to its operative position and the latch finger moves into latching engagement with the rim.

According to a further feature of the invention, the inner housing further includes at least one detent spring finger for latching coaction with a detent aperture in the outer housing to provide detented resistance to relative axial movement of the inner housing within the outer housing; detent means are provided between the depressor plate and the inner housing to provide detented resistance to axial movement of the depressor plate relative to the inner housing; and the detented resistance to movement of the inner housing within the outer housing is greater than the detented resistance to movement of the depressor plate relative to the inner housing whereby coupling movement of the first and second fittings initially results in movement of the depressor plate from its transport to its operative position to position the depressor plate feet in alignment with the apertures in the inner housing whereafter further coupling movement of the first and second fittings results in axial movement of the depressor plate and inner housing relative to the outer housing to allow the coacting cams structures on the outer housing and the depressor plate to move the depressor plate laterally to its latched position.

According to a further feature of the invention, the outer housing includes a further detent aperture spaced rearwardly from the detent aperture and operative to coact with the outer housing detent spring finger to define the final coupled position of the cable sub-assemblies.

According to a further aspect of the invention, the cable assembly comprises a first cable sub-assembly including a first core element having a free end and a first fitting positioned in surrounding relation to the first core element and a second cable sub-assembly including a second core element having a free end and a second fitting positioned in surrounding relation to the second core element; the free end of the first core element carries a latch member moveable laterally between an unlatched position in which the free ends of the core elements are disconnected and a latched position in which the free ends of the core elements are connected; and the first fitting includes an outer tubular housing moveable axially between an assembly position in surrounding relation to the latch member to preclude access to the latch member and a disassembly position axially removed from the latch member to allow access to the latch member for disassembly purposes. With this arrangement the overall length of the cable assembly is automatically adjusted in response to coupling of the end fitting and the cable sub-assemblies may be readily disassembled by moving the outer tubular housing axially to expose the latch member and allow the latch member to be disengaged.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIGS. 5 and 6 are perspective views of an outer housing of an end fitting;

FIG. 7 is a transverse cross-sectional view taken on line 7-7 of FIG. 5;

FIG. 8 is a transverse cross-sectional view of a latch member of an end fitting;

FIG. 9 is a longitudinal cross-sectional view of one of the end fittings;

DETAILED DESCRIPTION OF THE PREFERRED EMBODIMENT

Figure 1:
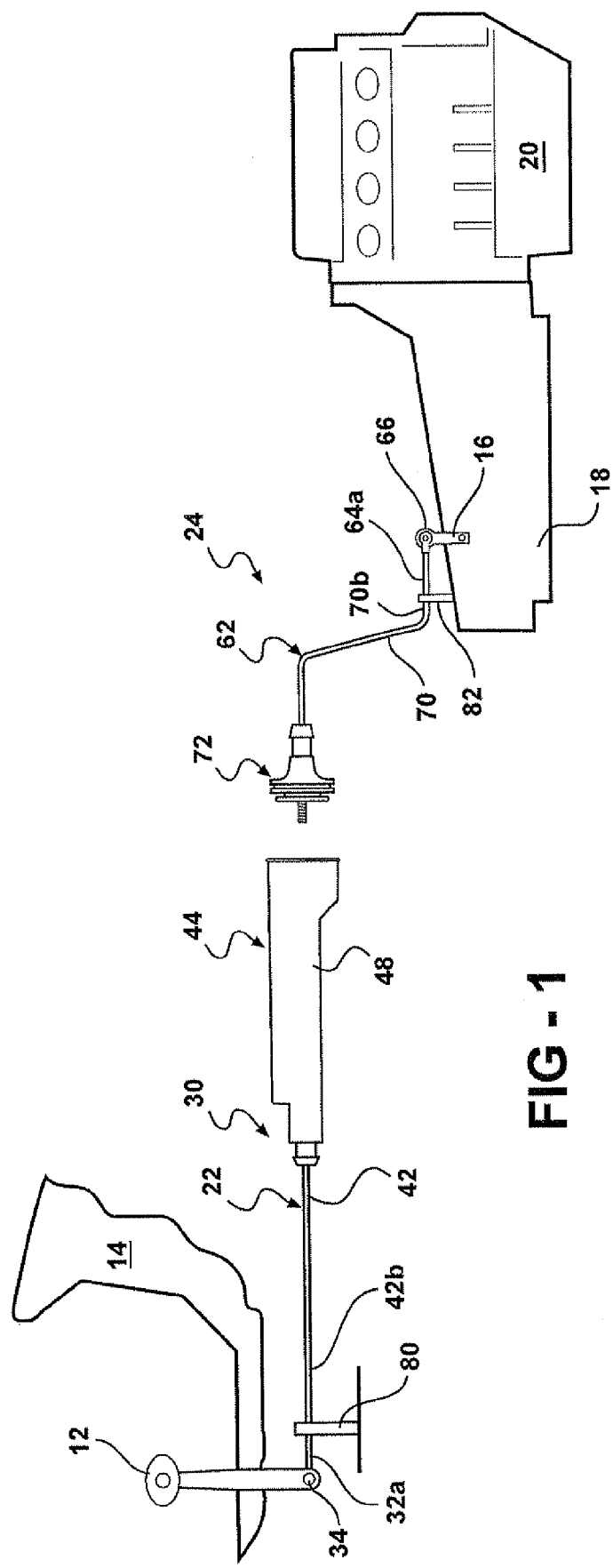
FIG. 1 is a schematic view showing a cable assembly according to the invention utilized to control a motor vehicle transmission.
Figure 2:
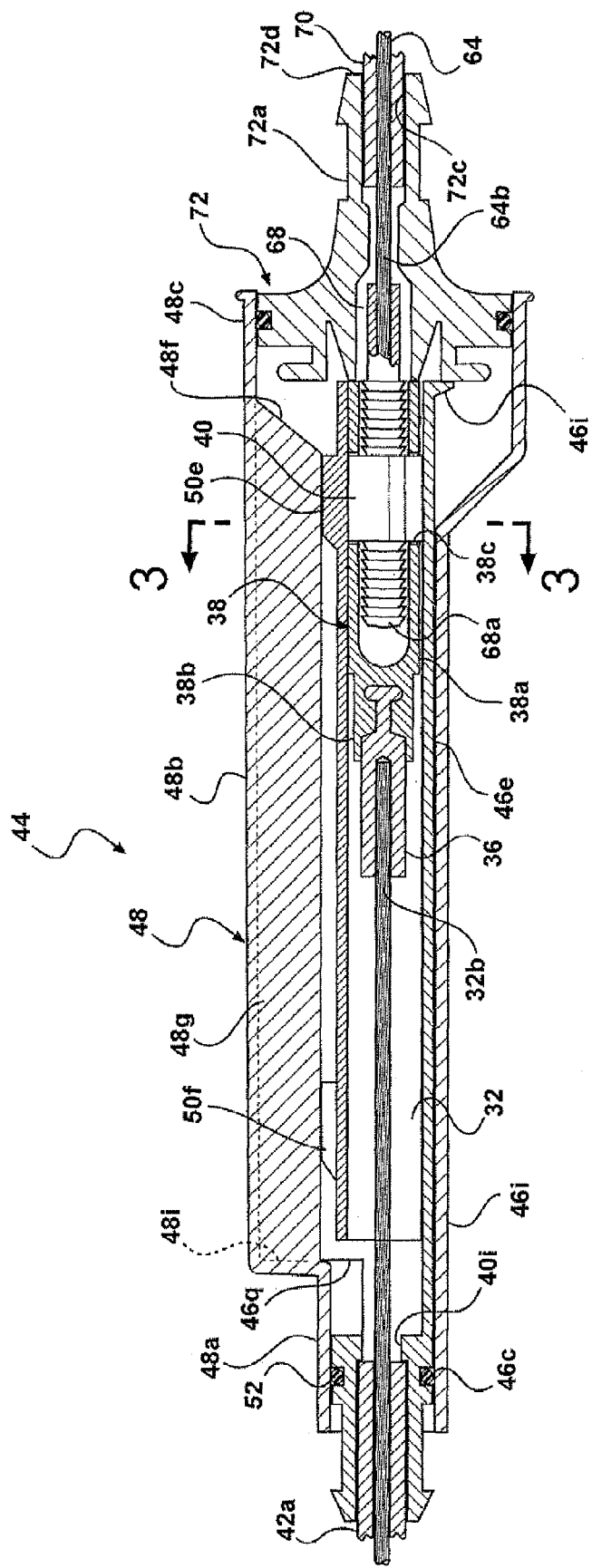
FIG. 2 is a longitudinal cross-sectional view of a connector portion of the cable assembly.

The cable assembly 10 of the invention is intended for use in operatively connecting an actuator member and a remote member. The cable assembly is disclosed as providing the operative connection between a shift lever 12 positioned in a passenger compartment 14 of a motor vehicle and a control lever 16 of a transmission 18 associated with the vehicle engine 20.

Cable assembly 10 includes a first cable subassembly 22 for connection to the shift lever and a second cable assembly 24 for connection to the transmission control lever 16.

Cable subassembly 22, broadly considered, includes a core element 28 and a guide length 30.

Core element 28 includes a core wire 32, a coupling 34 on one end 32a of the wire, a coupling 36 on another end 32b of the wire, a slider 38 secured to coupling 36, and a latch member 40.

Slider 38 includes a main body portion 38a of generally rectangular cross-sectional configuration and a fitting portion 38b of generally circular cross-sectional configuration fixedly secured to coupling 36. Main body portion 38a defines a generally rectangular through opening or window 38c.

Latch member 40 is sized to fit slidably in window 38c and has a generally U-shaped cross sectional configuration with parallel serrations 40a on the inner periphery.

Guide length 30 includes a guide conduit 42 surrounding core wire 32 and an end fitting 44 positioned in surrounding relation to the end 32b of core wire 32.

End fitting 44 includes an inner housing 46, an outer housing 48, and a depressor plate 50.

Inner housing 46 includes a fitting portion 46a of generally circular cross-sectional configuration and a main body portion 46b having an upwardly opening U-shaped cross-sectional configuration.

Fitting portion 46a receives an end 42a of guide conduit 42 and defines a groove 46c for receipt of an O-ring 52.

Main body portion 46b includes spaced side walls 46d, a bottom wall 46e, spring latch fingers 46f, detent latch fingers 46g, an arcuate pilot flange 46h, and an arcuate stop flange 46i.

Outer housing 48 has a generally tubular configuration and includes a fitting portion 48a of generally circular cross-sectional configuration, a main body portion 48b having a bottom flatted circular cross-sectional configurations and a leading end portion 48c having a circular cross-sectional configuration.

Depressor plate 50 has a downwardly opening U-shaped cross-sectional configuration including a top wall 50a and side walls 50b defining downwardly extending feet 50c proximate the leading and trailing ends of the plate. The leading end of top wall 50a has a forwardly projecting tab configuration 50d and a single central leading cam structure 50e and twin trailing cam structures 50f are defined on the upper face of top wall 50a.

In the assembled relation of cable sub-assembly 22, inner housing 46 is slidably positioned within outer housing 48 with O-ring 52 sealingly engaging the inner periphery of outer housing fitting portion 48a and inner housing bottom wall 46e positioned slidably on outer housing bottom wall 48c; latch member 40 is positioned in slider window 38c; slider 38 is slidably positioned in inner housing 46 with core wire 32 extending rearwardly within inner housing 46 for passage through a central bore 40i in inner housing fitting portion 46a; and depressor plate 50 is positioned within outer housing 48 with side walls 50b positioned slidably within inner housing side walls 48a, top wall 50a positioned in overlying relation to slider 38 and latch member 40 carried thereby, leading central cam structure 50e axially aligned with a central spine cam structure 48f on the upper inner periphery of outer housing arcuate wall 48d, and rearward cam structures 50f respectively axially aligned with circumferentially spaced rearward cam structures 48g on the upper inner periphery of outer housing arcuate wall 48d.

Cable sub-assembly 24 includes a core element 60 and a guide length 62.

Core element 60 includes a core wire 64, a coupling 66 on one end 64a of the core wire, and a rod 68 fixedly secured to the other end 64b of the wire.

Rod 68 has a circular cross-sectional configuration sized to pass through a central bore 38d in the forward wall of slider 38 and includes a plurality of parallel serrations 68a corresponding to the serrations 48a of latch member 40.

Guide length 62 includes a guide conduit 70 positioned in surrounding relation to core wire 64 and an end fitting 72 positioned in surrounding relation to the end 64b of core wire 64.

End fitting 72 has a generally circular cross-sectional configuration and includes an entry portion 72a and a main body portion 72b.

Entry portion 72a defines a central bore 72c opening in the rear face 72d of the fitting.

Main body portion 72b defines a groove 72e for receipt of an O-ring 74, a leading rim or flange portion 72f defined in part by the front leading annular face 72g of the fitting, and a central bore 72h opening in the face 72g. A restricted central bore 72i interconnects bore 72c and 72h.

In assembled relation of the cable assembly 24, one end 70a of guide conduit 70 is fixedly received in bore 72c with core wire end 64b passing freely through restricted bore 72i to position the rear end of rod 68 in bore 72h with the forward serrated portion of the rod positioned forwardly of the leading face 72g of the end fitting.

When installing the cable assembly as the remote control cable assembly for a vehicle transmission, coupling 34 of cable sub-assembly 22 is connected to shift lever 12, the end 42b of guide conduit 42 is fixedly secured to fixed bracket structure 80, coupling 66 of cable sub-assembly 24 is connected to transmission control lever 16, and the end 70b of guide conduit 70 is fixedly secured to fixed bracket structure 82.

In a typical motor vehicle assembly scenario the assembly of cable sub-assembly 22 to shift lever 12 occurs at a body assembly work station and the connection of the cable sub-assembly 24 to the transmission control lever 16 occurs at a chassis assembly workstation remote from the body assembly workstation. When the body and chassis are united and it is time for the end fittings to be coupled together to complete the remote control cable connection between the shift lever and the transmission control lever, the connections of the cable sub-assembly to the shift lever and of the cable sub-assembly to the transmission control lever are no longer accessible for adjustment purposes so it is imperative that as the cable sub-assemblies are connected the overall length of the core element is properly adjusted relative to the overall length of the conduit lengths. It is further imperative that a means be provided to readily disassembly the end fitting connection for repair or adjustment since, again, disassembly at the shift control lever or at the transmission control lever is very difficult if not impossible.

Operation

When cable sub-assembly 24 is shipped to the motor vehicle assembly facility, end fitting 72 is as seen in FIG. 9 with serrated rod 68 extending forwardly from the front leading face 72g of the fitting.

Figure 10:
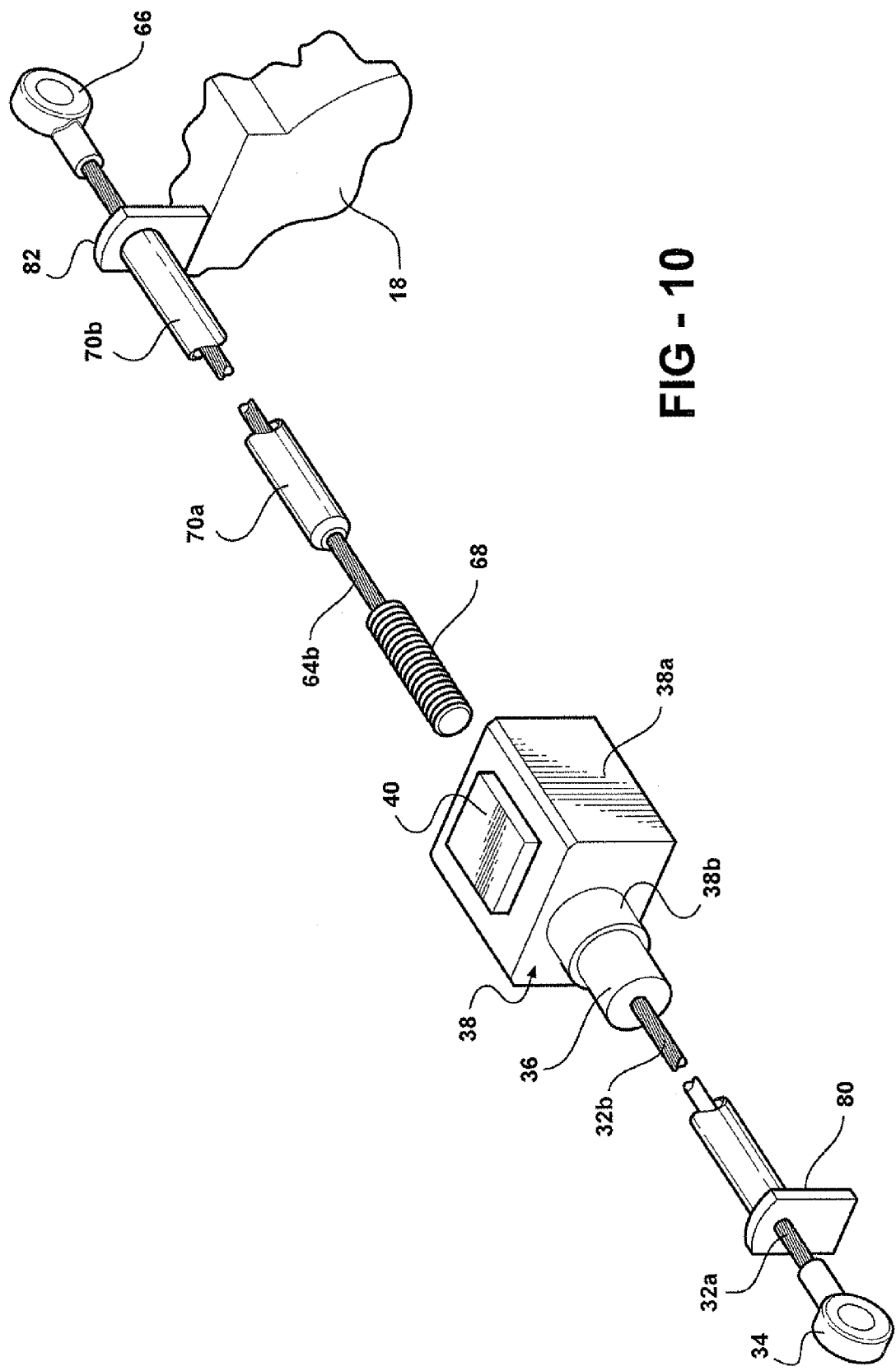
FIG. 10 is a perspective view of a core element assembly.
Figure 12:
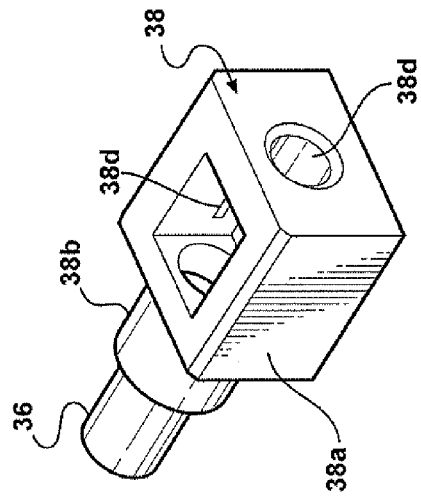
FIG. 12 is a perspective view of a slider utilized in a core element assembly.
Figure 11:
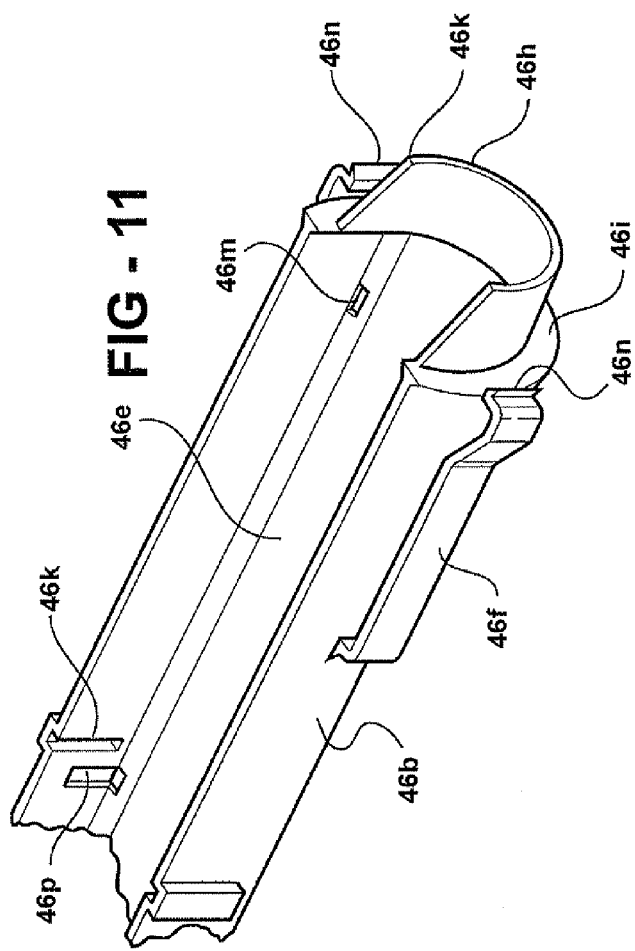
FIG. 11 is a fragmentary perspective view of an inner housing of an end fitting.
Figure 13:
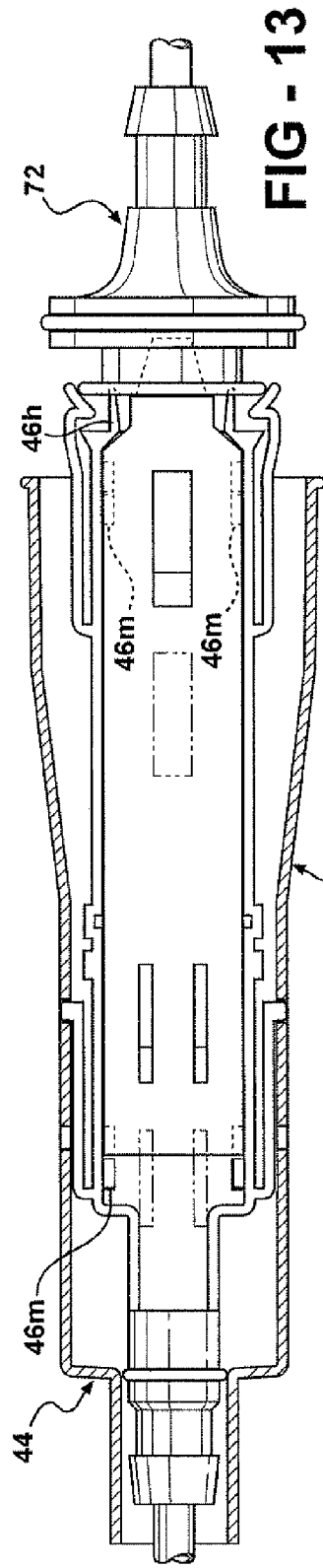
FIGS. 13, 14 and 15 are progressive views showing the coupling of the end fittings.
Figure 14:
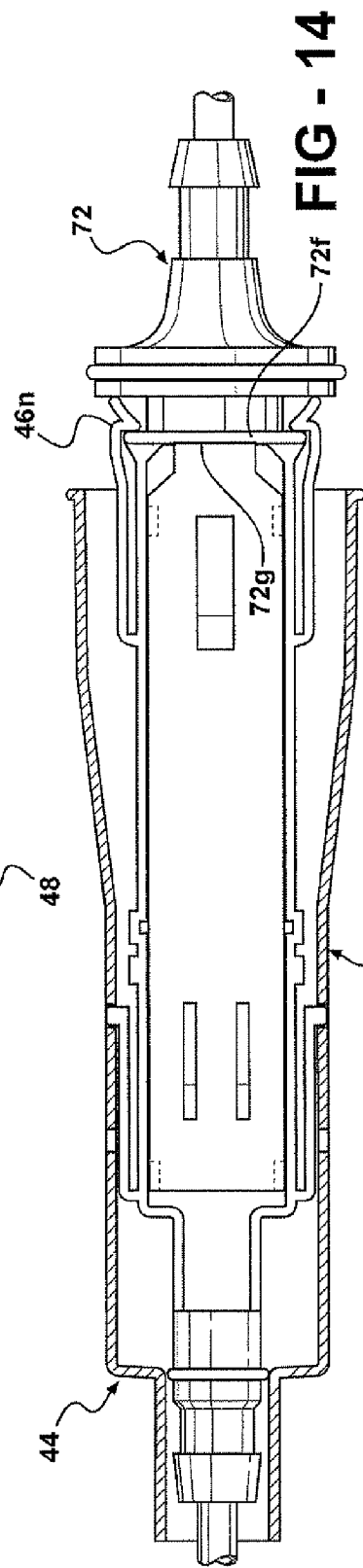
Figure 15:
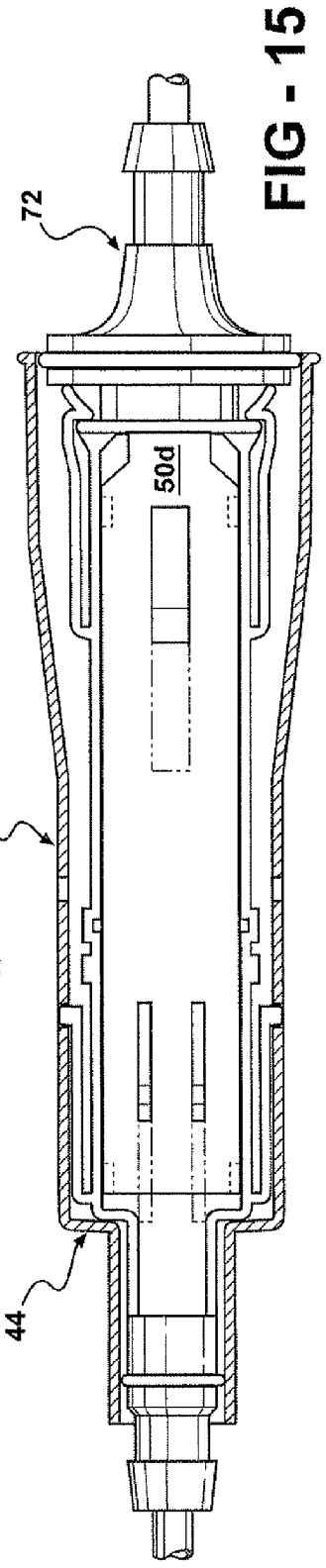

When cable sub-assembly 22 is shipped to the motor vehicle assembly facility, the various parts are arranged to insure that latch member 40 is maintained in the raised position within window 38b seen in FIG. 10. Specifically, the free end knob portions 46j of detent spring fingers 46g are in detenting engagement with detent apertures 48f in outer housing main body portion 48b, detent knobs 50g on depressor plate sidewalls 50c are received in detent grooves 46k in the inner face of side walls 46d of inner housing 46, depressor plate feet 50c are supported on the bottom wall 46e of inner housing 46 immediately forwardly of respective apertures 46m in the bottom wall, and coacting detent means 40b/38d on the latch member and on the slider maintain the latch member in the raised position within the window seen in FIG. 10. As seen in progressive FIGS. 13, 14 and 15, as the end fittings are brought together to couple the cable sub-assemblies together and complete the remote control cable assembly connection between the shift lever and the transmission control lever (with an assembly worker holding outer housing 48 of end fitting 44 in one hand and fitting 72 in the other hand) pilot flange face 46h on the leading end of the inner housing guides into a circular guide groove 72j on the leading face 72g of the end fitting 72 and front face 72g abuttingly engages tab 50d of the depressor plate 50. Since detent spring finger knob portions 46h in coaction with detent apertures 48f offer more detenting resistance than detent knobs 50g in coaction with detent grooves 46k, the initial abutting engagement of end fitting face 72g against tab 50d has the effect of moving the depressor plate 50 rearwardly within inner housing 46 to position detents 50g in further detent grooves 46p in the side walls of the inner housing, position feet 50c in overlying alignment with respective apertures 46m, bring central outer housing cam structure 48 into engagement with central depressor plate cam structure 50e, and bring outer housing cam structures 48g into engagement with depressor plate cam structures 50 Simultaneously, end fitting front face 72g engages the arcuate stop flange 46i of inner housing 46 and the ends 46n of latch fingers 46f snap over flange 72f Continued coupling together movement of the end fittings has the effect of moving the inner housing and the depressor plate rearwardly together within the outer housing with the result that the cam structures 50e, 50f, 48f, 48g coact to press the depressor plate downwardly, as allowed by the downward movement of feet 50c into holes 46m, which in turn has the effect of overcoming coacting detents 40b/38d and pressing latch member 40 downwardly to engage latch member serrations 40d with rod serrations 68a whereby to lock the core elements 28 and 60 together. One axial relative motion of the end fittings thus has the effect of coupling the end fittings together, locking the core elements together, and adjusting the effective overall length of the locked core elements relative to the effective overall length of the coupled guide lengths.

The final fully coupled position of the fittings is established by the engagement of knob portions 46j of detent fingers 46g in further outer housing detent apertures 48h and abutting engagement of shoulders 46q on the rear end of inner housing 46 with a shoulder surface 48i on the outer housing proximate the juncture of the main body portion of the outer housing and the fitting portion of the outer housing. The serrations 40a on the inner surface of latch member 40 have a circumferentially extent exceeding 180° so that as latch member 40 moves downwardly within window 38c into latching engagement with the serrations 68a of rod 68, the latch member snaps over center with respect to the rod to insure a firm positive engagement with the rod.

Figure 16:
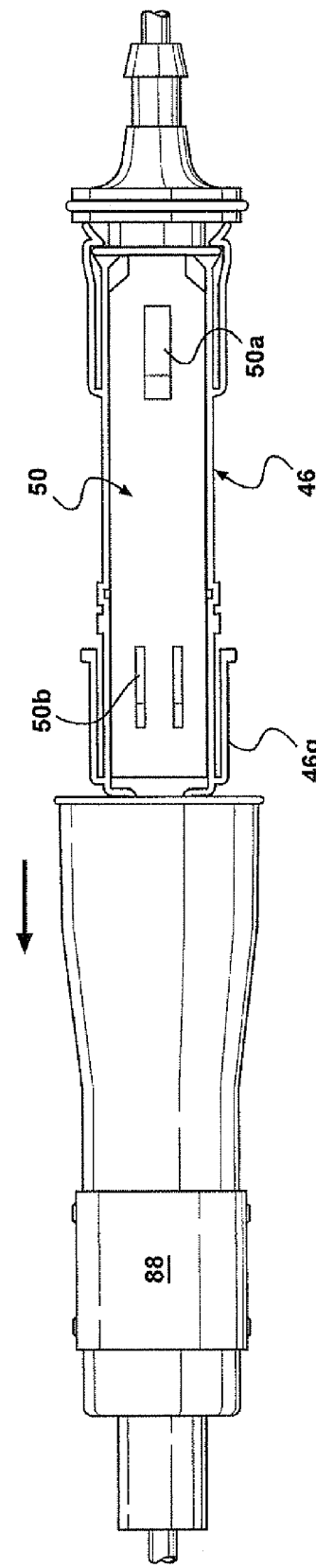
FIG. 16 is a view illustrating the disassembly of the end fittings.

When it is desired to disassemble the end fittings, either during the initial assembly of the vehicle or at a later date for maintenance or repair purposes, it is simply necessary to press inwardly through detent apertures 48h and then 48f against the knob portions 48j of detent fingers 46g to release the outer housing from the inner housing whereafter, as seen in FIG. 16, the outer housing may be pulled rearwardly relative to the inner housing to expose depressor plate 50 whereafter depressor plate 50 may be lifted upwardly out of the inner housing to expose latch member 40, whereafter the latch member may be lifted upwardly out of slider 38 to unlock the core elements and allow disassembly of the couplings.

Figure 3:
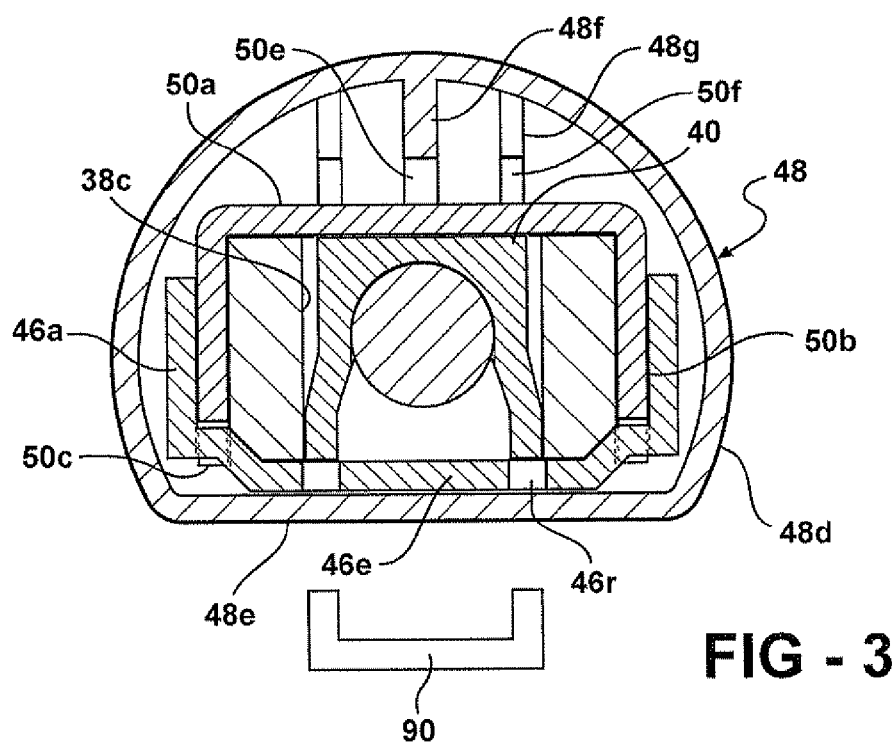
FIG. 3 is a transverse cross-sectional view taken on line 3-3 of FIG. 2.
Figure 5:
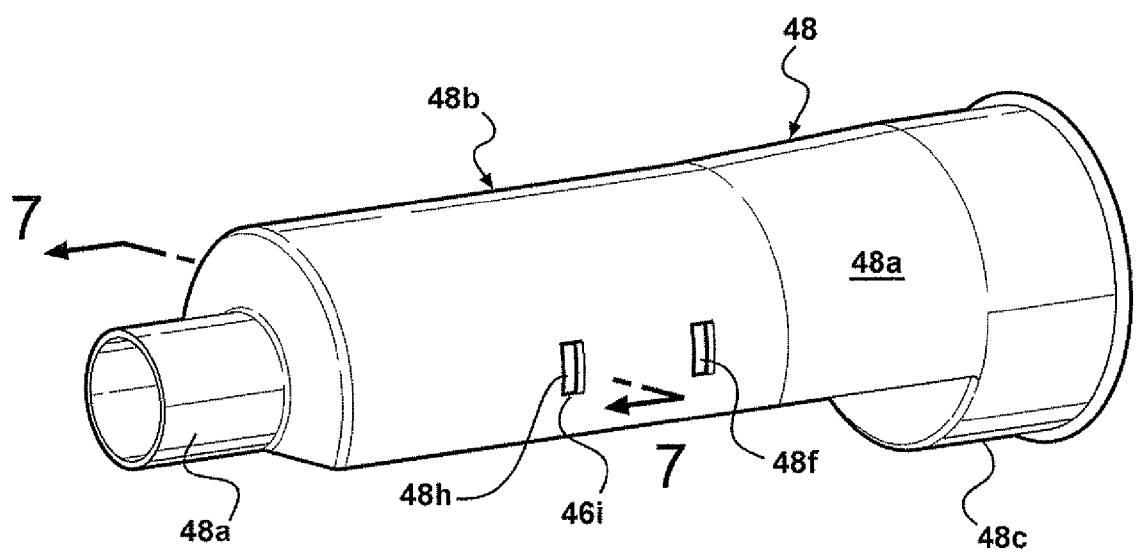
Figure 4:
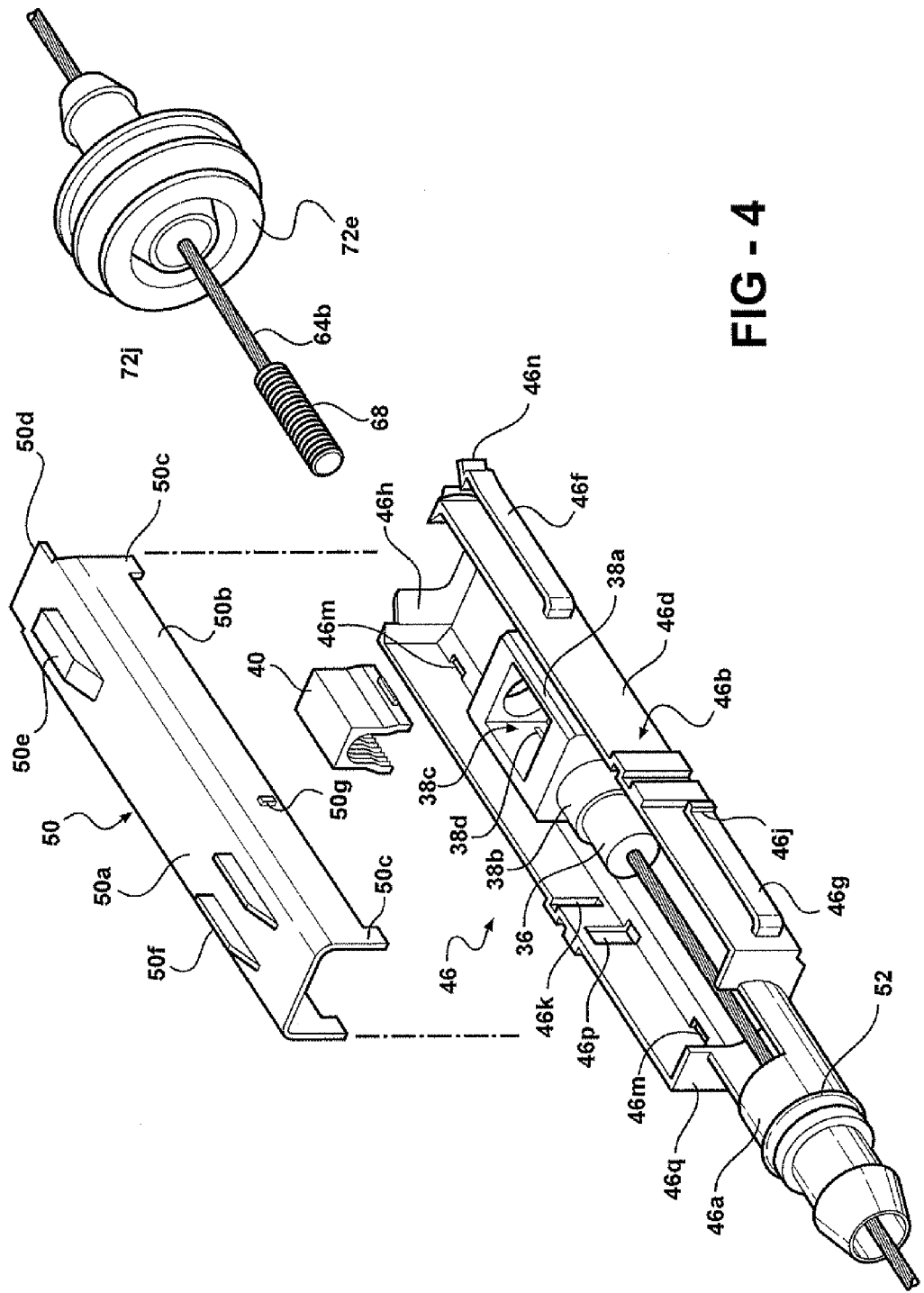
FIG. 4 is an exploded perspective view showing end fitting components of the cable assembly.

A cover 88 of elastomeric or other material may be wrapped around outer housing 48 to cover apertures 48f/48h. The cover should preferably be sufficiently pliable to allow depression of the detent fingers to release the outer housing without removal of the cover. Tactile location of the apertures 48f/48h through the cover 88, and engagement of the detent fingers to release the outer housing, may be facilitated by the provision of raised beads 48i in surrounding relation to apertures 48f/48h. To facilitate the removal of the latch member from the slider, slots 46r may be provided in the lower wall 46e of the inner housing to allow a tool, seen schematically at 90 in FIG. 3, to be inserted upwardly through slots 46r to disengage the latch member from the rod 68.

Disposable shipping covers, not shown, would also be provided over the end fitting 44 of cable subassembly 22 and the end fitting 72 of cable subassembly 24 to protect the coupling ends during shipping.

The invention will be seen to provide a cable sub-assembly construction wherein only a single relative axial motion is required to couple the guide lengths together, lock the core elements together, and adjust the effective overall length of the core elements relative to the effective overall length of the guide lengths. The cable sub-assembly construction of the invention also allows ready disassembly of the coupled sub-assemblies.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A remote control motion transmitting cable assembly comprising a first cable sub-assembly including a first core element having a free end, a first guide length including first guide conduit positioned in surrounding relation to the first core element and a first end fitting positioned in surrounding relation to the free end of the first core element, and a second cable sub-assembly including a second core element having a free end, a second guide length including a second guide conduit positioned in surrounding relation to the second core element and a second end fitting positioned in surrounding relation to the free end of the second core element, characterized in that:

the cable sub-assemblies include connector means operative in response to a single relative axial movement of the cable sub-assemblies to lock the end fittings together in a manner to preclude relative axial movement therebetween, lock the free ends of the core elements together in a manner to preclude relative axial movement therebetween, and adjust the effective overall length of the locked core elements relative to the effective overall length of the coupled guide lengths.

2. A remote control motion transmitting cable assembly according to claim 1 wherein the adjustment of the effective overall length of the core elements relative to the effective overall length of the locked guide lengths is effected by adjusting the overall length of the core elements.

3. A remote control motion transmitting cable assembly according to claim 2 wherein:

the connector means includes serrations on the free end of the second core element and serrated latch member carried by the free end of the first core element and moveable laterally into locking engagement with the second core element serrations in response to the relative axial movement of the cable sub-assemblies whereby to lock the free ends of the core elements together.

4. A remote control motion transmitting cable assembly according to claim 3 wherein:

the free end of the first core element comprises a slider mounting the latch member; and the first fitting includes an inner housing slidably mounting the slider, an outer housing positioned in surrounding relation to the inner housing, a depressor plate positioned within the outer housing in overlying relation to the slider and the latch member carried thereby, and coacting cam structures on the outer housing and the depressor plate operative in response to the relative axial movement of the cable sub-assemblies to move the depressor plate laterally and move the latch member laterally into locking engagement with the second core element serrations.

5. A remote control motion transmitting cable assembly according to claim 4 wherein:

the depressor plate is moveable axially relative to the inner housing between a transport position in which lateral movement of the depressor plate is precluded and an operative position in which lateral movement of the depressor plate is allowed; and the depressor plate is moveable axially from its transport position to its operative position in response to the initial relative axial movement of the cable sub-assemblies.

6. A remote control motion transmitting cable assembly according to claim 5 wherein;

the depressor plate includes a main body portion positioned in overlying relation to the slider and the latch member and a plurality of feet; and the inner housing includes a plurality of apertures for respective receipt of the depressor plate feet as the depressor plate is moved to its operative position.

7. A remote control motion transmitting cable assembly according to claim 6 wherein:

the inner housing includes at least one spring latch finger proximate a leading end thereof for latching coaction with a flange on a leading end of the second fitting; and the latch finger moves into latching engagement with the flange as the depressor plate moves from its transport to its operative position.

8. A remote control motion transmitting cable assembly according to claim 7 wherein:

the leading end of the second fitting moves into abutting engagement with the leading end of the first fitting as the depressor plate moves to its operative position and the latch finger moves into latching engagement with the flange.

9. A remote control motion transmitting cable assembly according to claim 8 wherein:
   detent means are provided between the inner housing and the outer housing to provide detented resistance to relative axial movement of the inner housing within the outer housing;
   detent means are provided between the depressor plate and the inner housing to provide detented resistance to axial movement of the depressor plate relative to the inner housing; and
   the detented resistance to movement of the inner housing within the outer housing is greater than the detented resistance to movement of the depressor plate relative to the inner housing whereby coupling movement of the first and second fittings initially results in movement of the depressor plate relative to the inner housing from its transport to its operative position to position the depressor plate feet in alignment with the apertures in the inner housing whereafter further coupling movement of the first and second fittings results in axial movement of the depressor plate and the inner housing relative to the outer housing to allow the coacting cam structures on the outer housing and the depressor plate to move the depressor plate laterally and move the latch member laterally into locking engagement with the second core element serrations.

10. A remote control motion transmitting cable assembly according to claim 9 wherein the detent means between the outer housing and the inner housing comprises a detent spring finger on the inner housing coacting with a detent aperture in the outer housing.

11. A remote control motion transmitting cable assembly according to claim 4 wherein disassembly of the cable assembly comprises axial movement of the outer housing relative to the inner housing to a disassembly position, separation of the depressor plate from the inner housing, and movement of the latch member from its latched to its unlatched position.

12. A remote control motion transmitting cable assembly according to claim 3 wherein the first end fitting includes a housing moveable axially relative to the free end of the first core element between an assembly position in surrounding relation to the latch member to preclude access to the latch member and a disassembly position axially removed from the latch member to allow access to the latch member for disassembly purposes.

13. A remote control motion transmitting cable assembly comprising a first cable sub-assembly including a first core element having a free end and a first fitting positioned in surrounding relation to the first core element, and a second cable sub-assembly including a second core element having a free end and a second fitting positioned in surrounding relation to the second core element, characterized in that:
   the free end of the first core element carries a latch member moveable laterally between an unlatched position in which the free ends of the core elements are disconnected and a latched position in which the free ends of the core elements are connected; and
   the first fitting includes an outer tubular housing moveable axially between an assembly position in surrounding relation to the latch member to preclude access to the latch member and a disassembly position axially removed from the latch member to allow access to the latch member for disassembly purposes.

14. A remote control transmitting cable assembly according to claim 13 wherein:
   the free end of the first core element comprises a slider carrying the latch member; and
   the first fitting further includes an inner housing positioned within the outer housing and slidably mounting the slider, a depressor plate carried by the inner housing in overlying relation to the slider and the latch member carried thereby and moveable axially relative to the outer housing, and coacting cam structures on the outer housing and the depressor plate operative in response to relative axial movement between the outer housing and the depressor plate to move the depressor plate laterally and move the latch member laterally to its latched position.

15. A remote control motion transmitting cable assembly according to claim 14 wherein:
   the depressor plate is moveable axially relative to the inner housing between a transport position in which lateral movement of the depressor plate is precluded and an operative position in which lateral movement of the depressor plate is allowed; and
   the depressor plate is moveable from its transport to its operative position in response to contact with the second fitting as the first and second sub-assemblies are brought together.

16. A remote control motion transmitting cable assembly according to claim 15 wherein:
   the depressor plate includes a main body portion positioned in overlying relation to the slider and the latch member and a plurality of feet; and
   the inner housing includes a plurality of apertures for respective receipt of the depressor plate feet as the depressor plate is moved to its operative position.

17. A remote control motion transmitting cable assembly according to claim 16 wherein:
   the inner housing includes at least one spring latch finger proximate a leading end thereof for latching coaction with a flange on a leading end of the second fitting; and
   the latch finger moves into latching engagement with the flange as the depressor plate moves from its transport to its operative position.

18. A remote control motion transmitting cable assembly according to claim 17 wherein the leading end of the second fitting moves into abutting engagement with the leading end of the first fitting as the depressor plate moves to its operative position and the latch finger moves into latching engagement with the flange.

19. A remote control motion transmitting cable assembly according to claim 18 wherein:
   detent means are provided between the outer housing and the inner housing to provide detented resistance to relative axial movement of the inner housing within the outer housing;
   detent means are provided between the depressor plate and the inner housing to provide detented resistance to axial movement of the depressor plate relative to the inner housing; and
   the detented resistance to movement of the inner housing within the outer housing is greater than the detented resistance to movement of the depressor plate relative to the inner housing whereby coupling movement of the first and second fittings initially results in movement of the depressor plate relative to the inner housing from its transport to its operative position to position the depressor plate feet in alignment with the apertures in the inner housing whereafter further coupling movement of the first and second fittings results in axial movement of the depressor plate and the inner housing relative to the outer housing to allow the coacting cams structures on the outer housing and the depressor plate to move the depressor plate laterally and move the latch member laterally into locking engagement with the second core element serrations.

20. A remote control motion transmitting cable assembly according to claim 19 wherein the detent means between the inner housing and the outer housing comprises a detent spring finger on the inner housing coacting with an aperture in the outer housing.

21. A remote control transmitting cable assembly according to claim 14 wherein disassembly of the cable assembly comprises axial movement of the outer housing relative to the finer housing to a disassembly position, separation of the depressor plate from the inner housing, and movement of the latch member from its latched to its unlatched position.

22. A remote control motion transmitting cable assembly according to claim 1 wherein the connector means are operative in response to the single relative axial movement to first lock the end fittings together and thereafter lock the free ends of the core elements together.

* * * * *